US006297830B1

(12) United States Patent (10) Patent No.: US 6,297,830 B1
Hoddie et al. (45) Date of Patent: Oct. 2, 2001

(54) APPARATUS AND METHOD FOR STORING A MOVE WITHIN A MOVIE

(75) Inventors: Peter Hoddie, Mountain View; James D. Batson, Sunnyvale; Sean Michael Callahan, Cupertino, all of CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 09/049,715

(22) Filed: Mar. 27, 1998

Related U.S. Application Data

(62) Division of application No. 08/570,542, filed on Dec. 11, 1995, now Pat. No. 5,751,281.

(51) Int. Cl.$^7$ ................................................ G06T 15/70
(52) U.S. Cl. ................................... 345/473; 345/302
(58) Field of Search ................................ 345/328, 302, 345/473, 326; 386/46

(56) References Cited

U.S. PATENT DOCUMENTS

| | | | |
|---|---|---|---|
| 4,538,188 | 8/1985 | Barker et al. | 360/14.3 |
| 5,109,482 | 4/1992 | Bohrman | 395/154 |
| 5,202,961 | 4/1993 | Mills et al. | 395/159 |
| 5,237,648 | 8/1993 | Mills et al. | 395/133 |
| 5,339,393 | 8/1994 | Duffy et al. | 395/161 |
| 5,359,712 | 10/1994 | Cohen et al. | 395/161 |
| 5,388,197 | 2/1995 | Rayner | 395/154 |
| 5,442,744 | 8/1995 | Piech et al. | 395/154 |
| 5,592,602 | 1/1997 | Edmunds et al. | 395/174 |
| 5,592,609 | 1/1997 | Suzuki et al. | 395/173 |
| 5,606,655 | 2/1997 | Arman et al. | 395/140 |
| 5,751,281 | * 5/1998 | Hoddie et al. | 345/302 |
| 5,831,617 | 11/1998 | Bhukhanwala | 345/349 |

OTHER PUBLICATIONS

Adobe Premere$^{3.0}$ User's Guide, p. (2), 1994.*
Adobe Premere 4.0 User Guide, pp. 49, 264, May 1994.*
Adobe Premiere 3.0 User Guide, pp. 5–6, 22, 28, 220–223, 1994.*
RCA Model VR673HF User's Guide, pp. 12, 17, 19, 1994.*
The O2 System, by O. Deux et al., Communications of the ACM/Oct. 1991/vol. 34, No. 10, pp. 34–48.
CCWS: A Computer–Based, Multimedia Information System, by A. Poggio, et al., 1985 IEEE, pp. 92–103.
Object Composition and Playback Models for Handling Multimedia Data, by Rei Hamakawa, et al., Proceedings of the First ACM International Conference on Multimedia, Anahaeim, CA, U.S.A., 1993, 9 pgs.
A Structure for Transportable, Dynamic Multimedia Documents, by Dick C.A. Bulterman, et al., USENIX–Summer 91–Nashville, TN, pp. 137–155.
Adobe Premier User Guide, version 4.0, Adobe Systems Incorporated, 1994.

* cited by examiner

Primary Examiner—Mark Zimmerman
Assistant Examiner—Lance W. Sealey
(74) Attorney, Agent, or Firm—Blakely, Sokoloff, Taylor & Zafman

(57) ABSTRACT

A hierarchical movie is provided. A hierarchical movie is a movie that contains one or more embedded movies. Embedded movies may themselves contain embedded movies. Each movie contains zero or more media sequences. Within a hierarchical movie, media sequences that should be edited together may be grouped together using embedded movies. The media sequences of a hierarchical movie may be sequenced during playback based on a different time coordinate system than the time coordinate system that governs any embedded movies. This allows a movie to contain both time-based and time-independent media sequences. Also, the relative timing of events in the movie may vary from performance to performance. The hierarchical movie structure allows movies to be used as user interface controls, and even as field-sensitive databases.

17 Claims, 11 Drawing Sheets

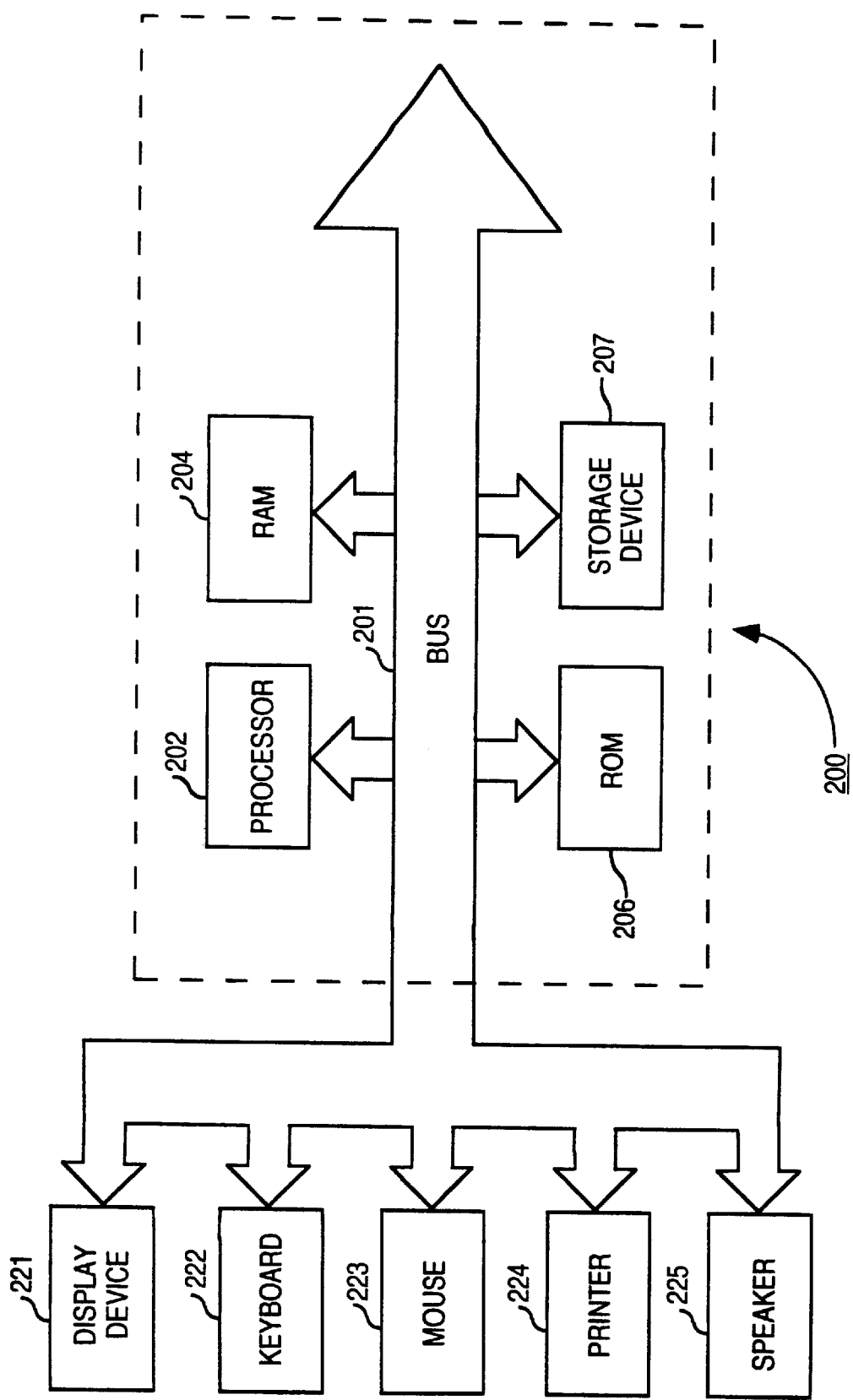

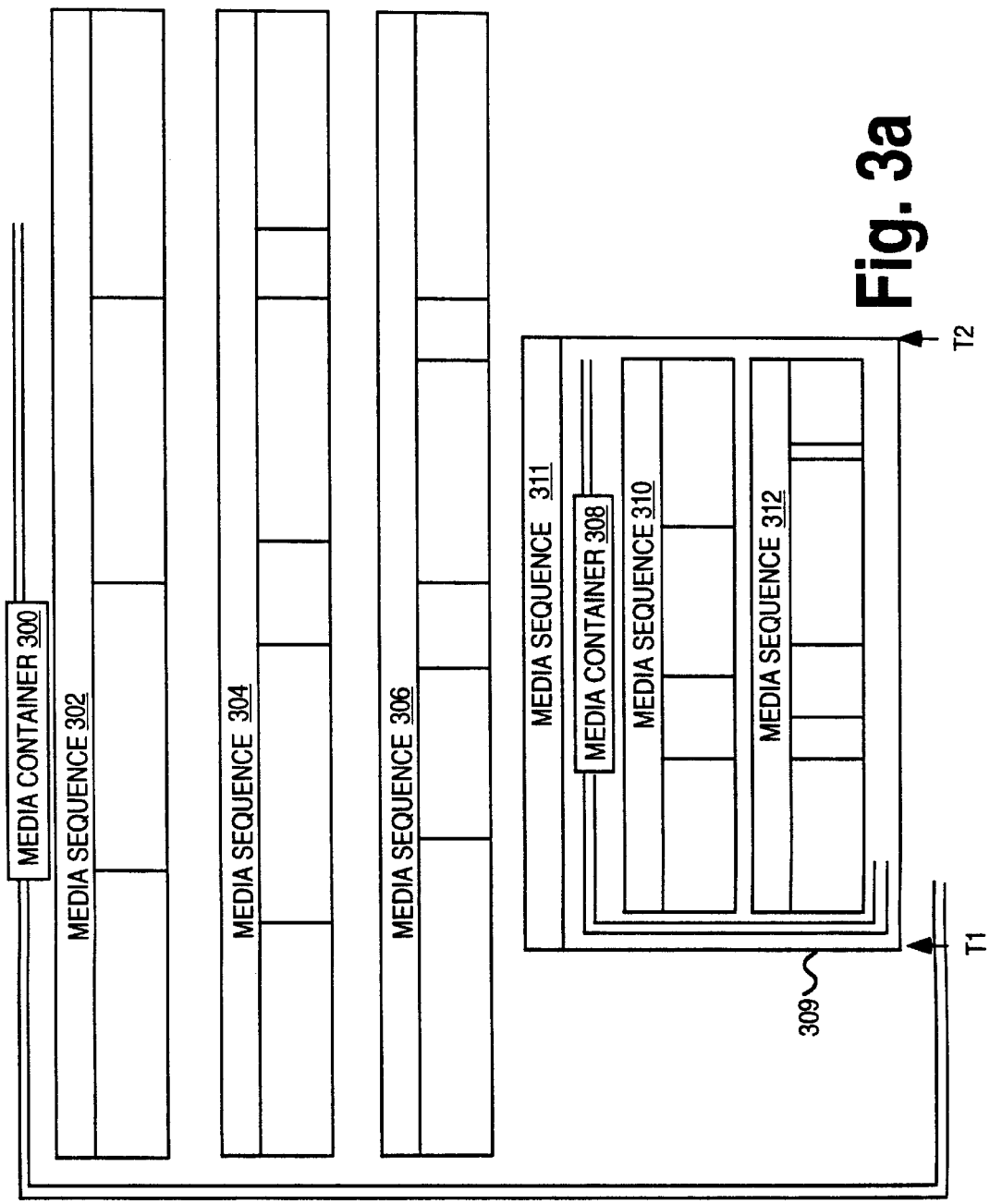

APPARATUS AND METHOD FOR STORING A MOVE WITHIN A MOVIE

This application is a divisional of patent application Ser. No. 08/570,542, filed on Dec. 11, 1995 for "Apparatus and Method for Storing a Movie Within a Movie" by J. Peter Hoddie et al., which is now U.S. Pat. No. 5,751,281.

FIELD OF THE INVENTION

The present invention relates to a hierarchical movie structure, and more specifically, to a structure for embedding a movie within another movie.

BACKGROUND OF THE INVENTION

A movie generally consists of a set of tracks slaved to a movie clock. In a typical movie, the array of tracks includes a video track and an audio track. A video track consists of a sequence of samples of video data. An audio track is a sequence of samples of audio data.

Besides video and audio tracks, movies may also include tracks which store other types of information. For example, a movie may also include a text track that contains text for subtitles, a music track separate from the main audio track, and a time code track.

FIG. 1 illustrates a typical movie 100. Movie 100 includes a video track 122 that includes a sequence of video samples 102, 104, 106, 108 and 110. Movie 100 also includes a sound track 124 that includes a sequence of audio samples 112, 114, 116, 118 and 120. When movie 100 is played, playback of all of the tracks of the movie 100 are synchronized based on a movie clock. For example, at a time T1 of the movie clock, video sample 102 is being displayed and audio sample 112 is being played. At a time T2 of the movie clock, the video sample 104 is being displayed and audio sample 114 is being played. The audio and video samples that are being played at any given time on the movie clock remain the same for each performance of movie 100.

If one track of a movie is edited, some of the other tracks of the movie may also have to be edited. Consider, for example, a movie in which a character is giving a speech with the national anthem playing in the background. If one wishes to delete a portion of the speech from the movie, the corresponding sequence of video must be cut from the video track, the corresponding sequence of audio must be cut from the audio track, and the corresponding text sequence must be cut from the text track. However, to maintain the continuity and integrity of the national anthem, the corresponding music track should not be cut.

Flat movie formats provide no mechanism for keeping track of relationships between tracks. Because the editing of one track of a movie may require the editing of some but not all of the other tracks in the movie, movie editing can quickly become a difficult and complex task. Complex editing operations are even more complicated. For example, during an operation in which one movie is created by splicing together tracks of other movies, it may be virtually impossible to keep track of which tracks should and should not be edited together.

Based on the foregoing, it is desirable to simplify the movie editing process. It is further desirable to expand the application of movies beyond simple deterministic time-based media playback applications.

SUMMARY OF THE INVENTION

A hierarchical movie is provided. A hierarchical movie is a movie that contains one or more embedded movies. Embedded movies may themselves contain embedded movies. Each movie contains zero or more media sequences. Within a hierarchical movie, media sequences that should be edited together may be grouped together using embedded movies. The media sequences of a hierarchical movie may be sequenced during playback based on a different time coordinate system than the time coordinate system that governs any embedded movies. This allows a movie to contain both time-based and time-independent media sequences. Also, the relative timing of events in the movie may vary from performance to performance. The hierarchical movie structure allows movies to be used as user interface controls, and even as field-sensitive databases.

According to one embodiment of the invention, a hierarchical media container is provided. The hierarchical media container includes a first set of media sequences. One media sequence in the first set of media sequences contains and an embedded media container including a second set of media sequences.

The hierarchical media container may or may not have the same relationship to time as the embedded media container. For example, in one embodiment both the hierarchical media container and the embedded media container are time-based media containers. In another embodiment, the hierarchical media container is a time-independent media container and the embedded media container is a time-based media container. In yet another embodiment, the hierarchical media container is a time-based media container and the embedded media container is a time-independent media container.

According to another aspect of the invention, a method for providing a "control movie" is provided. According to the method, a user may select a parameter value by interacting with a movie. The method may be used in a computer system that includes a display device.

The method includes a step for providing a media container that includes a media sequence of visual data. The media sequence includes a plurality of samples. The plurality of samples includes a set of samples. Each sample in the set is associated with a value. The method also includes steps for determining a current sample from the set of samples, establishing the value associated with the current sample as the parameter value, and displaying on the display device the image represented by the current sample.

The method also includes the steps of receiving input from the user specifying a sequencing direction, determining a next sample, the next sample being a sample of the set of samples located in the sequencing direction relative to the current sample, establishing the value associated with the next sample as the parameter value, and displaying on the display device the image represented by the next sample.

According to another aspect of the invention, a method for editing a movie is provided. According to the method, a first plurality of media sequences of the movie is stored in a first container. A second plurality of media sequences of the movie is stored in a second container. One of the first container and the second container are embedded in the other of the first container and the second container. An edit of a media sequence of the second plurality of media sequences is received from a user. All media sequences of the second plurality of media sequences are automatically edited responsive to receiving the edit.

According to another embodiment of the invention, a method for playing a movie is provided. According to the method, a first plurality of samples of a first media sequence are sequentially played. The first media sequence is stored in a first media container. A second plurality of samples of a second media sequence is also sequentially played. The second media sequence is stored in a second media container. The second media container is embedded within the first media container.

Optionally, the step of sequentially playing the first plurality of samples may be performed responsive to a first time coordinate system, while the step of sequentially playing the second plurality of samples is performed responsive to a second time coordinate system, where the first time coordinate system is different from the second time coordinate system.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 illustrates a computer system upon which the present invention may be implemented;

FIG. 3a illustrates a hierarchical movie structure according to an embodiment of the invention;

FIG. 3b illustrates a hierarchical movie structure that has more complex hierarchical relationships than that illustrated in FIG. 3a;

FIG. 9b illustrates a database movie generated responsive to the media container shown in FIG. 9a;

FIG. 10b illustrates a database movie generated responsive to the media container shown in FIG. 10a.

DETAILED DESCRIPTION OF THE PREFERRED EMBODIMENT

Figure 1:
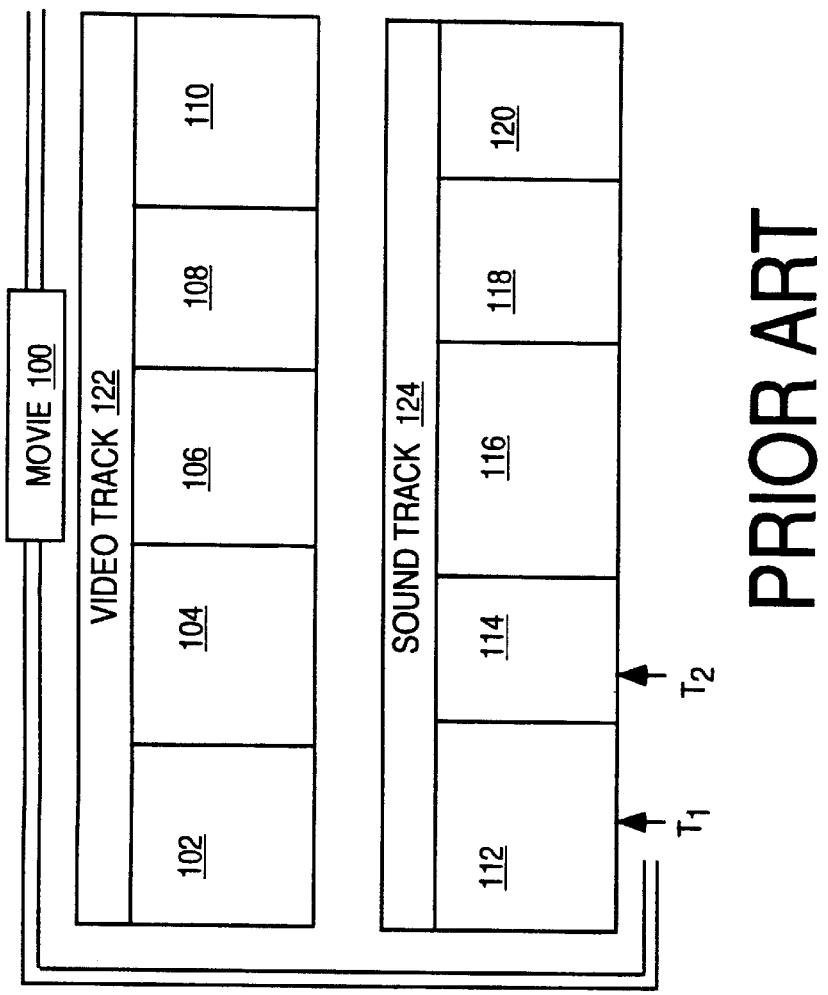
FIG. 1 illustrates a movie structure used in the prior art.

A method and apparatus for creating and using a movie within a movie is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Referring to FIG. 2, it illustrates a computer system 200 upon which the preferred embodiment of the present invention can be implemented. Computer system 200 comprises a bus or other communication means 201 for communicating information, and a processing means 202 coupled with bus 201 for processing information. System 200 further comprises a random access memory (RAM) or other dynamic storage device 204 (referred to as main memory), coupled to bus 201 for storing information and instructions to be executed by processor 202. Main memory 204 also may be used for storing temporary variables or other intermediate information during execution of instructions by processor 202. Computer system 200 also comprises a read only memory (ROM) and/or other static storage device 206 coupled to bus 201 for storing static information and instructions for processor 202.

Furthermore, a data storage device 207 such as a magnetic disk or optical disk and its corresponding disk drive can be coupled to computer system 200. Computer system 200 can also be coupled via bus 201 to a display device 221, such as a cathode ray tube (CRT), for displaying information to a computer user. An alphanumeric input device 222, including alphanumeric and other keys, is typically coupled to bus 201 for communicating information and command selections to processor 202. Another type of user input device is cursor control 223, such as a mouse, a trackball, or cursor direction keys for communicating direction information and command selections to processor 202 and for controlling cursor movement on display device 221. This input device typically has two degrees of freedom in two axes, a first axis (e.g., x) and a second axis (e.g., y), which allows the device to specify positions in a plane.

Alternatively, other input devices such as a stylus or pen can be used to interact with the display. A displayed object on a computer screen can be selected by using a stylus or pen to touch the displayed object. The computer detects the selection by implementing a touch sensitive screen. Similarly, a light pen and a light sensitive screen can be used for selecting a displayed object. Such devices may thus detect selection position and the selection as a single operation instead of the "point and click," as in a system incorporating a mouse or trackball. Stylus and pen based input devices as well as touch and light sensitive screens are well known in the art. Such a system may also lack a keyboard such as 222 wherein all interface is provided via the stylus as a writing instrument (like a pen) and the written text is interpreted using optical character recognition (OCR) techniques.

Another device which may be coupled to bus 201 is hard copy device 224. Hard copy device 224 may be used for printing instructions, data, or other information on a medium such as paper, film, or similar types of media. Additionally, computer system 200 can be coupled to a device for audio playback 225 such as a speaker. Further, the device may include a speaker which is coupled to a digital to analog (D/A) converter for playing back the digitized sounds. Finally, computer system 200 can be a terminal in a computer network (e.g., a LAN).

In the currently preferred embodiment, computer system 200 is one of the Macintosh® family of personal computers such as the Macintosh® II manufactured by Apple® Computer, Inc. of Cupertino, Calif. (Apple and Macintosh are registered trademarks of Apple Computer, Inc.). In the currently preferred embodiment, the present invention is related to the use of a computer system 200 to create, store, and play back movies that contain other movies.

Terms

In the following discussion, the term "media sequence" refers to a plurality of ordered samples. A video track, for example, is a media sequence in which each sample contains video data representing an image. Similarly, a sound track is a media sequence in which each sample contains audio data representing sound.

The term "media container" refers to a data structure that includes zero or more media sequences. A QuickTime movie is a media container in that it stores multiple media sequences, such as video tracks, audio tracks, sound tracks, text tracks, etc. QuickTime movies are described in detail in Inside Macintosh:QuickTime by Apple Computer Inc., published by Addison-Wesley Publishing Company (1993). All of the media sequences that belong to a media container are sequenced according to a common time coordinate system.

The terms "embedded movie", "contained movie", "embedded media container" and "contained media container" refer to a media container that is a logical component of another movie container. The terms "containing movie" and "containing media container" refer to the media container of which an embedded movie is a logical component. As shall be explained below, the media sequences of an embedded movie are not necessarily sequenced according to the same time coordinate system as the media sequences that belong to the containing movie.

Significantly, the embedded relationship is a logical relationship, not a physical relationship. Therefore, the data that represents an embedded movie is not necessarily located in the same physical file or even on the same physical storage device as other data "contained in" the containing movie. For example, a movie A stored in a file A located on a storage medium A and a movie B that is stored in a file B located on a storage medium B may both be embedded in a movie C that also includes tracks D, E and F that are stored in a file G on a storage medium H. In embodiments where the embedded relationship is not reflected in the actual physical location of data, control data structures are used to reflect the logical relationship between files.

During playback, all media sequences progress from sample to sample based on the occurrence of an event. When the event is the passage of time in a time coordinate system, the media sequences are referred to as "time-based" media sequences. A video track is an example of a time-based media sequence. During playback, a sample in a video media sequence is displayed for a set time interval. After the time interval expires, the next sample in the video media sequence is displayed. This process continues until all of the samples in the video media sequence have been displayed. The time interval may be modified to speed up or slow down playback, but the playback timing is still driven by the passage of time.

If the event that causes a media sequence to progress from one sample to the next is anything other than the passage of time in a time coordinate system, the media sequence is referred to as a "time-independent" media sequence. For example, consider a media sequence in which each sample contains the text of a page in a novel. During playback, the page represented in a sample should be displayed until the reader has completed reading the page. Since reading speeds vary greatly, the playback mechanism should not display the page associated with the next sample until the reader indicates a desire to turn the page. Thus, a mechanism may be provided to the user through which the user may initiate an event to move to the next page. For example, a user may operate a mouse or other pointing device to click on a "Turn Page" button to cause the playback mechanism to sequence to the next sample.

A media container is "slaved" to a clock if the clock determines when the media sequences that belong to the media container progress from one sample to the next. All of the media sequences in a typical movie are slaved to the same clock (the "movie clock") to ensure that the media sequences remain synchronized during playback. A media container is "independent" of a clock if the media sequences within the media container are sequenced based on an event other than the passage of time on the clock. For example, a media container is independent of a clock if playback of the media sequences within the media container may be slowed without slowing the clock.

A sequencing direction is the direction in which a media sequence is played relative to the order of the samples. Because media sequences are "ordered", all media sequences have at least two possible sequencing directions. For the purposes of discussion, these two sequencing directions will be referred to as "forward" and "backward". However, it should be understood that "forward" does not necessarily mean the "normal" or "typical" direction, since some applications may process media sequences in one direction, other applications may process media sequences in the other direction, and yet other applications may process sequences in either or both directions.

The "active interval" of a sample is the time interval during which the sample may be played. For example, the active interval for the first video sample in a 30-frame per second movie is the first 1/30 second of playback.

Playback Mechanism

In the preferred embodiment, the mechanism for playing a movie is implemented through a series of instructions executed on processor 202. Initially, the series of instruction may be stored on storage device 207. When the playback mechanism is invoked, the instructions are copied from storage device 207 into memory 204, and then accessed and executed by processor 202.

During execution of the series of instructions, the samples of the media sequences of a movie are processed by processor 202 responsive to the series of instructions. Specifically, processor 202 causes the samples to be "played". The particular steps for playing a sample depend on the nature of the data within the sample. For example, a sample of video data is "played" by causing the image represented in the sample to be displayed on display device 221. Samples containing audio data are played by generating the sound represented in the audio sample. Sound may be generated, for example, on speaker 225.

Processor 202 sequences through the movie responsive to the series of instructions. The series of instructions may cause processor 202 to sequence through the movie responsive to the passage of time and/or the occurrence of another type of event. An event which causes processor 202 to sequence to the next sample in a media sequence may be a user-actuated event, such as the selection of a key on keyboard 222, or the operation of a user-interface control through actuation of mouse 223.

Hierarchical Media Containers

Typical movies include a plurality of time-based media sequences that are played back based on a common time coordinate system. According to one aspect of the present invention, a media container format is provided in which media sequences may contain samples that are themselves media containers. Such media containers may be stored, for example, on storage device 207.

Referring to FIG. 3a, it illustrates a media container 300 that contains four media sequences 302, 304, 306 and 311.

Media sequences 302, 304 and 306 are typical media sequences, such as sound, video or text tracks. Media sequence 311 contains a sample 309 that contains another media container 308. Media container 308 includes two media sequences 310 and 312.

The active interval of sample 309 is between times T1 and T2. Consequently, media container 308 may only be played during times T1 and T2. These times are determined by the mechanism used to sequence media container 300.

Because one media container 308 is a component of a media sequence 311 in another media container 300, a hierarchy exists between the media containers. The data structure that establishes this hierarchy is referred to herein as a hierarchical media container. As mentioned above, the "contained in" relationship is logical, not necessarily physical. Thus, the data for each of the various media sequences shown in FIG. 3a may be stored in separate files on separate storage devices.

While FIG. 3a illustrates media container 300 with a single embedded media container 308, the hierarchical media container structure allows media containers to have any number of embedded media containers. Specifically, a single media container may contain multiple media sequences that contain embedded media containers. In addition, a single media sequence may have multiple samples, each of which contains its own embedded media container. Further, embedded media containers may themselves contain media sequences that contain embedded media containers. As a result, the structure of media containers may be tailored to particular applications.

Figure 3B:
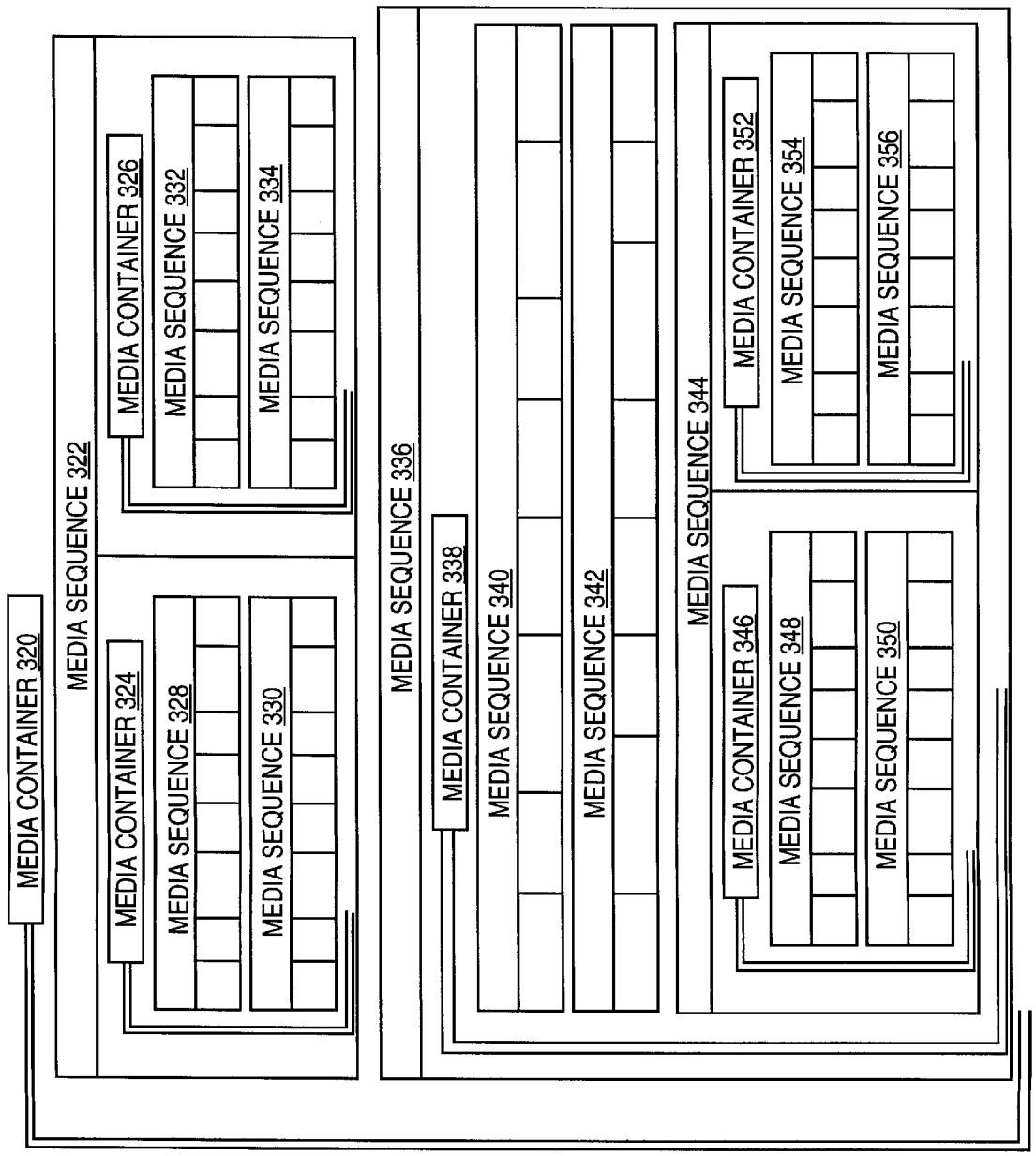

FIG. 3b illustrates a media container 320 that has a more complicated hierarchical structure than media container 300 in FIG. 3a. Media container 320 contains two media sequences 322 and 336, each of which contain embedded media containers. Media sequence 322 contains two movie samples. The first movie sample in media sequence 322 contains a media container 324, and the second movie sample contains a media container 326. Media container 324 contains two media sequences 328 and 330, and media container 326 contains two media sequences 332 and 334.

Media sequence 336 contains one movie sample. The movie sample contained in media sequence 336 contains a media container 338 that has three media sequences 340, 342 and 344. Media sequence 344 has two movie samples which contain media container 346 and media container 352 respectively. Media container 346 includes media sequences 348 and 350, while media container 352 contains media sequences 354 and 356. Thus, media containers 346 and 352 are embedded in a media container 338 that is itself embedded in a media container 320.

At least two significant benefits result from the use of hierarchical media containers. First, the logical relationship between related media sequences may be reflected in the structure of the media container itself. Second, different media sequences within a single movie may be driven by different time coordinate systems.

These benefits make it possible to use movies for applications that previously required complex, custom-designed objects. In addition, the task of editing and combining movies is simplified. Various applications made possible by the ability to embed media containers within media containers shall now be described in greater detail.

Synchronously-Played Embedded Movies

In the simplest example of an embedded movie, all media sequences are time-based and the time coordinate system that applies to the embedded movie is slaved to the time coordinate system that applies to the containing movie. For example, assume that media sequences 302, 304, 306, 310, 311 and 312 are all time-based media sequences. Because media sequences 302, 304, 306 and 311 belong to media container 300, media sequences 302, 304, 306 and 311 will sequence based on a common time coordinate system during playback. Similarly, because media sequences 310 and 312 belong to media container 308, media sequences 310 and 312 will sequence based on a common time coordinate system during playback.

In the simplest situation, the time coordinate system used to sequence the media sequences in media container 300 is the same time coordinate system used to sequence the media sequences in media container 308. In this situation, media sequences 310 and 312 will be played back as if they where simply two more media sequences contained in media container 300.

A Synchronously-Played Embedded Movies

The time coordinate system that applies to an embedded movie need not be slaved to the time coordinate system that applies to the containing movie. Thus, the time coordinate system for media container 300 may be a different time coordinate system than that used to sequence media container 308.

Figure 4:
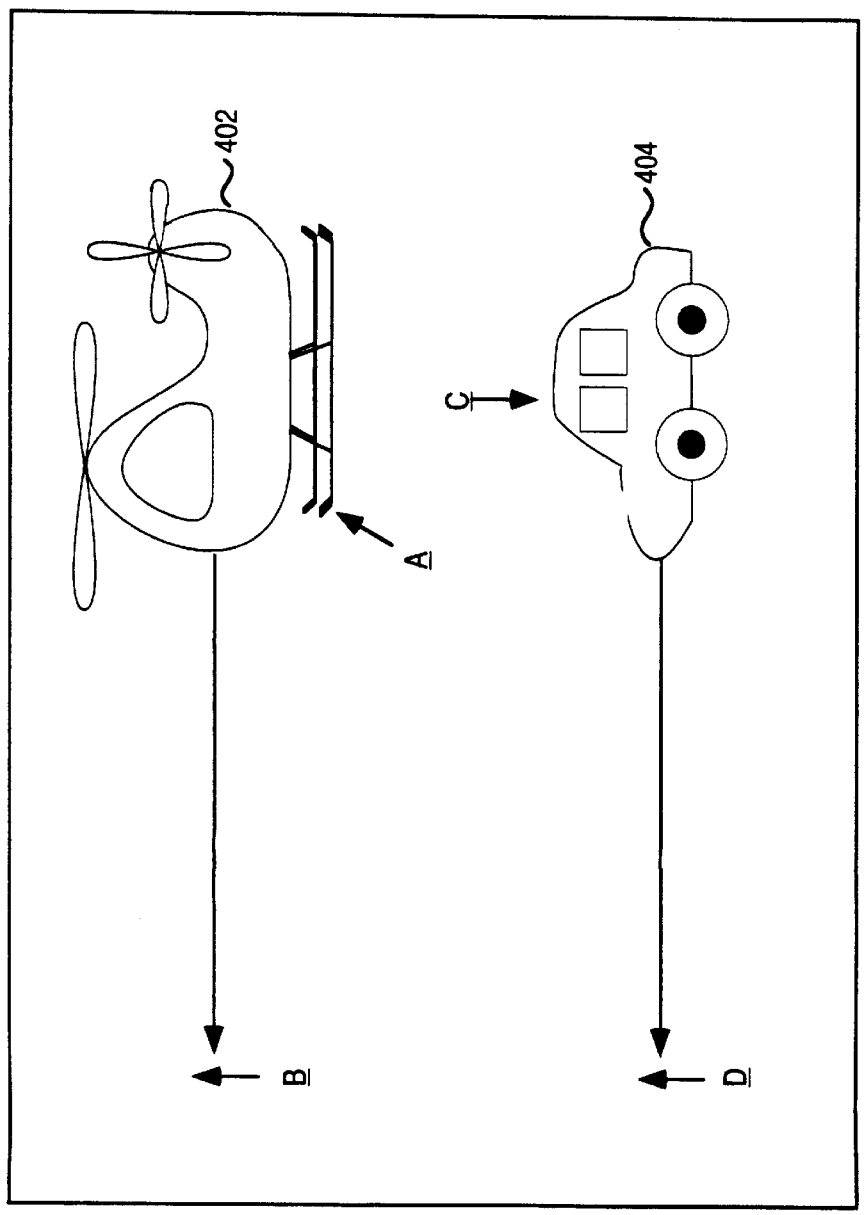
FIG. 4 illustrates a movie generated based on data stored in a hierarchical movie structures where a time-based movie is embedded in a time-based movie.

Because media containers embedded in a given media container may have different time coordinate systems than the given media container, various multimedia effects are possible. For example, a user may be able to speed up or slow down certain aspects of a movie relative to other aspects of a movie. Consider the situation in which media sequences 302, 304 and 306 represent the sound and image of a helicopter 402 as it flies form a point A to a point B, as shown in FIG. 4. Media sequences 310 and 312 may represent the sound and image of a car 404 as it travels from a point C to a point D. Because media container 308 is not slaved to the clock of media container 300, playback of the media sequences associated with car 404 relative to playback of the media sequences of helicopter 402 may vary from performance to performance.

For example, during one performance of media container 300, helicopter 402 may begin to move before car 404. During another performance, car 404 may begin to move before helicopter 402. Similarly, during one performance, helicopter 402 may move faster than car 404. During another performance, car 404 may move faster than helicopter 402. The relative playback starting times and playback rates may be based on user input. Thus, users may operate controls to cause helicopter 402 and car 404 to race across the screen, where the outcome of the race is not predetermined.

Stop Data

When an embedded movie is not slaved to the clock of the containing movie, it is possible for the playback of the embedded movie to be completed before the end of the active interval of the sample in which the embedded movie is contained. For example, if media container 308 is slaved to a clock that is running twice as fast as the clock associated with media container 300, then media container 308 may be played twice between T1 and T2. Under some circumstances it is desirable for the embedded movie to play in a continuous loop during the active interval with which it is associated. Under other circumstances, it is desirable for the embedded movie to play once and then stop, even if the active interval for the sample in which it is contained has not ended. Under yet other circumstances, it is desirable for the embedded movie to play up to N times, and then stop, where N is some specified number.

Based on the foregoing, one embodiment of the invention allows "stop data" to be stored for each embedded movie. The stop data specifies a condition under which the playback mechanism is to stop playing the embedded movie. For example, the stop data may indicate that the playback mechanism is to stop playing an embedded movie after it has been repeated ten times. The playback mechanism reads the stop data and stops playback of the embedded movie when one of the following events occurs: (1) the termination condition specified in the stop data is satisfied, or (2) the active interval associated with the embedded movie ends.

Time-Independent Within Time-Based

Hierarchical media containers may be used to mix time-based media sequences with time-independent media sequences. For example, media sequences 302, 304 and 306 may be time-based media sequences while media sequences 310 and 312 are time-independent sequences.

Figure 5:
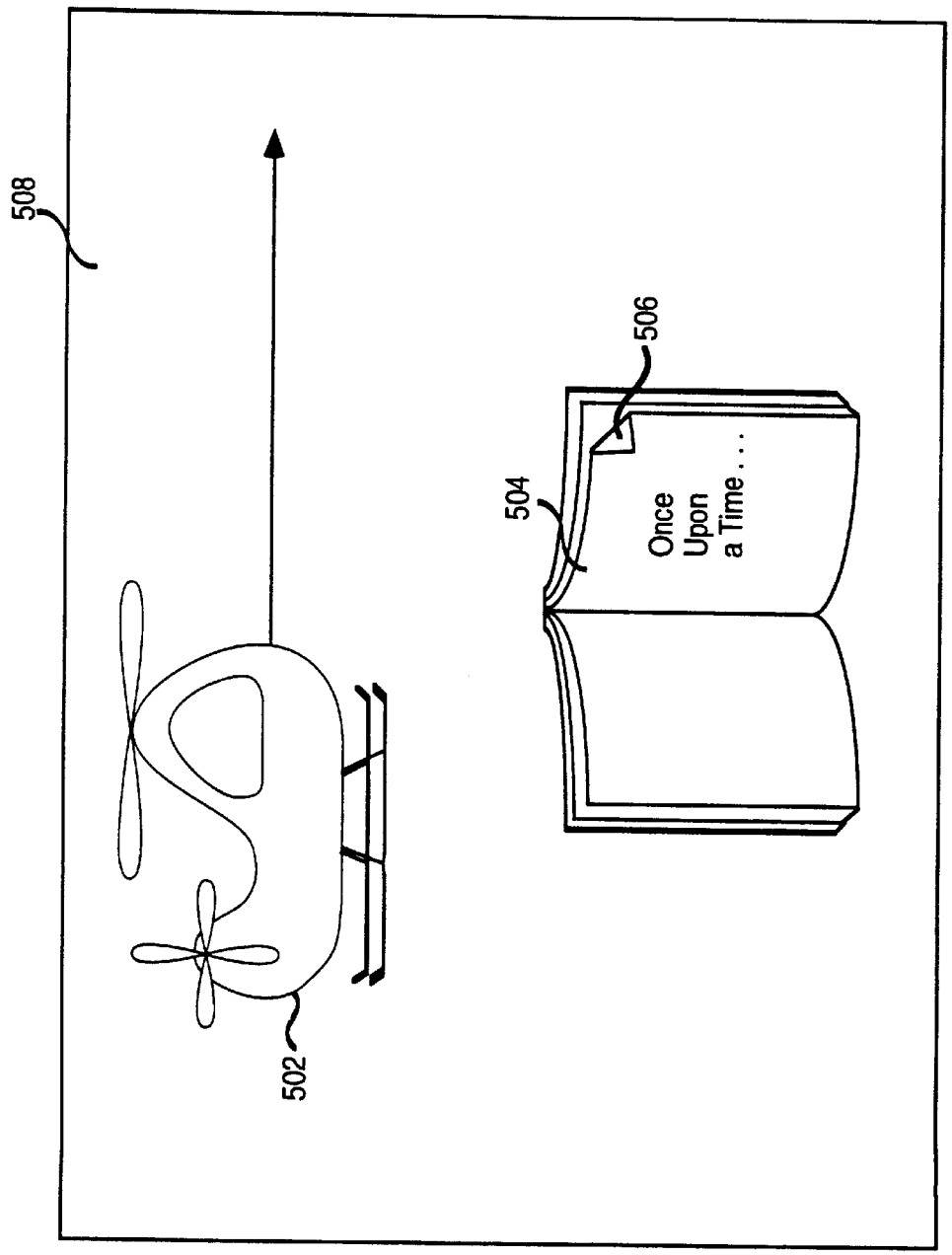
FIG. 5 illustrates a movie generated based on data stored in a hierarchical movie structure where a time-independent movie is embedded within a time-based movie.

FIG. 5 illustrates one application of a time-independent movie embedded in a time-based movie. In FIG. 5, media sequences 302, 304 and 306 provide the video and sound for a helicopter 502 flying across a screen 508. While the helicopter 502 is flying across the screen 508, a user may browse through a book 504. The text of book 504 may be stored in media sequence 310, and the sound of turning pages may be stored in media sequence 312. When a user selects the upper portion 506 of a page, the media sequences 310 and 312 are advanced (text of the next page is shown, and the sound of a page turning is generated). The rate at which the user turns pages has no affect on the rate at which helicopter 502 moves across the screen 508.

Time-Based Within Time-Independent

A media container storing time-based sequences may also be embedded in a media container that stores time-independent sequences. For example, media sequences 302, 304 and 306 may be time-independent media sequences, while media sequences 310 and 312 are time-dependent sequences.

Figure 6:
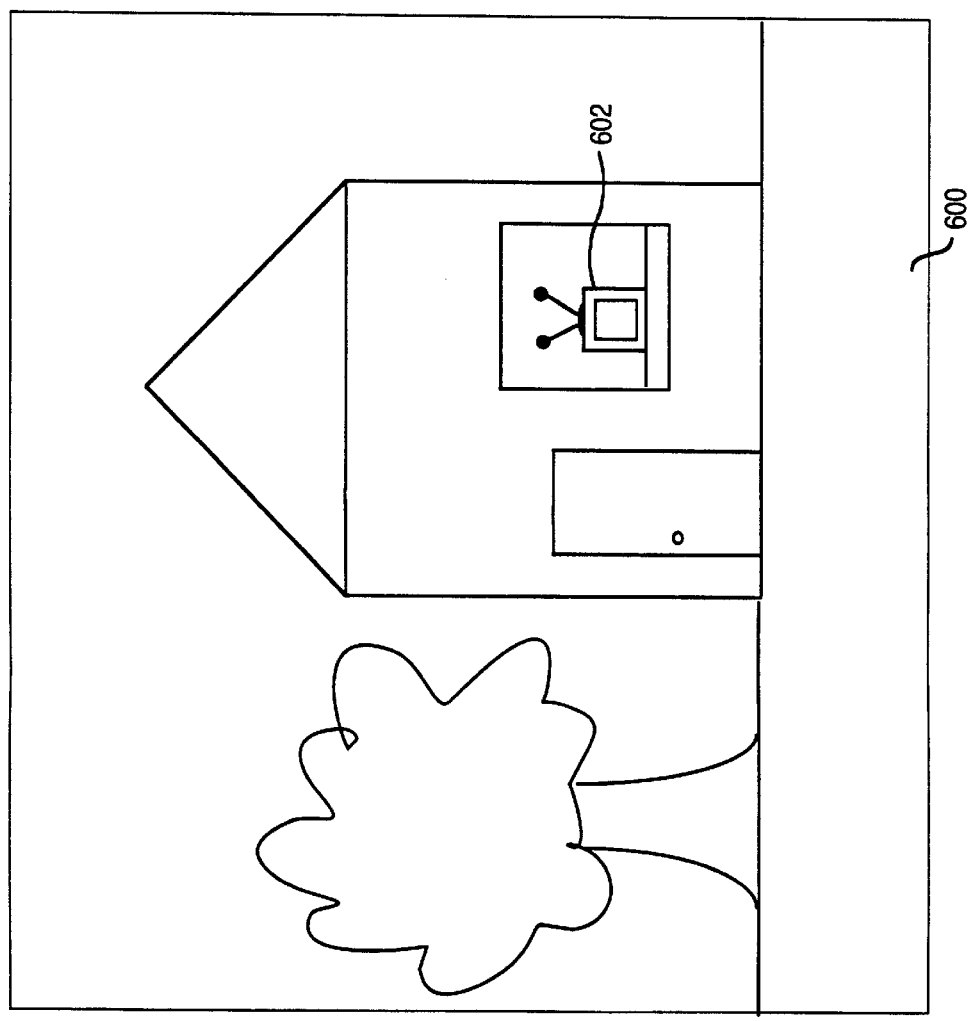
FIG. 6 illustrates a time-based movie generated based on a hierarchical movie-structure where a time-based movie is embedded in a time-independent movie.

Referring to FIG. 6, media sequences 302, 304 and 306 may correspond a series of static scenes. The user may move from one scene to the next by entering user input to cause media sequences 302, 304 and 306 to sequence to subsequent information samples. One of the static scenes 600 may include the image of a television 602. Media sequences 310 and 312 may store video and audio that is played on the television 602. The rate at which media sequences 310 and 312 are played is unrelated to the rate at which a user moves from one scene to the next.

Time-Independent Within Time-Independent

A media container storing time-independent sequences may be embedded in a media container that stores time-independent sequences. For example, each sample in the media sequences of the containing media container may correspond to a chapter of a book. One of the media sequences of the containing media container may contain embedded movies. Each embedded movie may contain the text for each page in a chapter of the book. One button may be provided for sequencing the containing movie (to move from chapter to chapter). A second button may be provided for sequencing the embedded movies (to move from page to page within a chapter).

Editing Operations

With the movie structures of the prior art, editing operations are complicated by the fact that edits to some tracks in a movie may require edits to some but not all other tracks in the movie. Editing operations may be simplified by using the hierarchical media container structure of the present invention to reflect relationships between media sequences. Specifically, related media sequences may be stored in the same media container, while unrelated media sequences are assigned to different containers in the hierarchical structure.

Consider the example of a speech made during a performance of the national anthem. Edits to the video track should be reflected in the audio track and the subtitle track. However, video edits should not affect the sound tracks. Using a hierarchical media container structure, the media sequences of the video, audio and subtitle tracks can be stored in a first media container, and the media sequences of the sound tracks can be stored in a second media container. The second media container can be embedded in the first media container. Editing utilities may then be configured to respond to edits by automatically editing all media sequences that belong to the same media container as the edited media sequence, and to leave all other media sequences intact.

The process of incorporating clips from many movies into a single movie is also simplified through the use of embedded movies. Consider, for example, a movie with sixty tracks created by combining tracks from twenty different sources. In the prior art movie structure, there is no indication of relationship between tracks. Therefore, the inadvertent destruction of synchronization between related tracks is difficult to avoid. Using embedded media containers, the relationship between related tracks may be maintained.

Specifically, all of the clips from the same source can be stored in the same embedded media container. Thus, when a media sequence is modified, the editor need only look to the other media sequences in the same media container to determine whether other media sequences must be modified responsive to the modification. Consequently, embedded containers provide to editors the ability to maintain logical media sequence groupings. This ability, in turn, makes complex editing operations more manageable.

Space Savings

Use of hierarchical media containers may also reduce the size of some movies. For example, consider a twenty minute movie in which a four minute musical theme is repeated five times. Using the prior art movie structure, the movie would contain a sound track covering the full twenty minutes of music. Using a hierarchical media container structure, a four minute media sequence could be stored in a first media container separate from a second media container that stores the rest of the movie. The first media container may then be embedded in the second media container. Attributes of the first media container may be set so that playback of the first media container begins with the playback of the second media container and continuously repeats until the end of playback of the second media container. During playback, the movie will appear and sound the same, but the sound data of the hierarchical media container will take up approximately one fifth as much storage space as the twenty minute sound track.

Animated Controls

Many computer applications display "controls" through which a user may designate operational parameters.

Examples of such controls include scroll bars, check boxes and radio buttons. Controls typically allow a user to select one value from a predetermined range of values. For example, a user may designate the value "checked" or the value "unchecked" by interacting with a checkbox. A user may select one of a range of values by interacting with a scroll bar. In general, the more complicated the control, the more difficult it is to display and manage the control.

According to one aspect of the present invention, a "control movie" is provided. A "control movie" is a movie that performs the traditional functions of a control. More specifically, a control movie is a media container that contains at least one media sequence, where (1) samples in the media sequence are associated with parameter values and (2) the current sample of the media sequence determines the value of a parameter.

Figure 7:
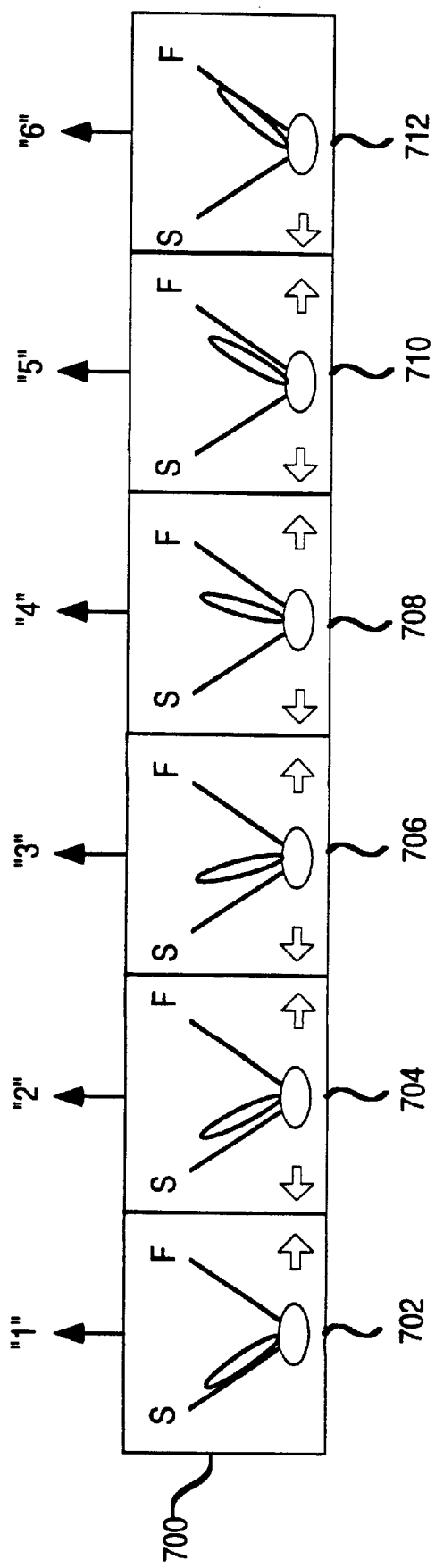
FIG. 7 illustrates a movie sequence for a control movie according to an embodiment of the invention.

Referring to FIG. 7, a media sequence 700 of a control movie is illustrated. Media sequence 700 is a video media sequence and includes an ordered series of samples 702, 704, 706, 708 and 710 of video data. Each sample of video data in media sequence 700 represents an image. Each sample in media sequence 700 is also associated with a value for a parameter. Specifically, sample 702 is associated with the value "1", sample 704 is associated with the value "2", sample 706 is associated with the value "3", sample 708 is associated with the value "4", sample 710 is associated with the value "5" and sample 712 is associated with the value "6".

Figure 8:
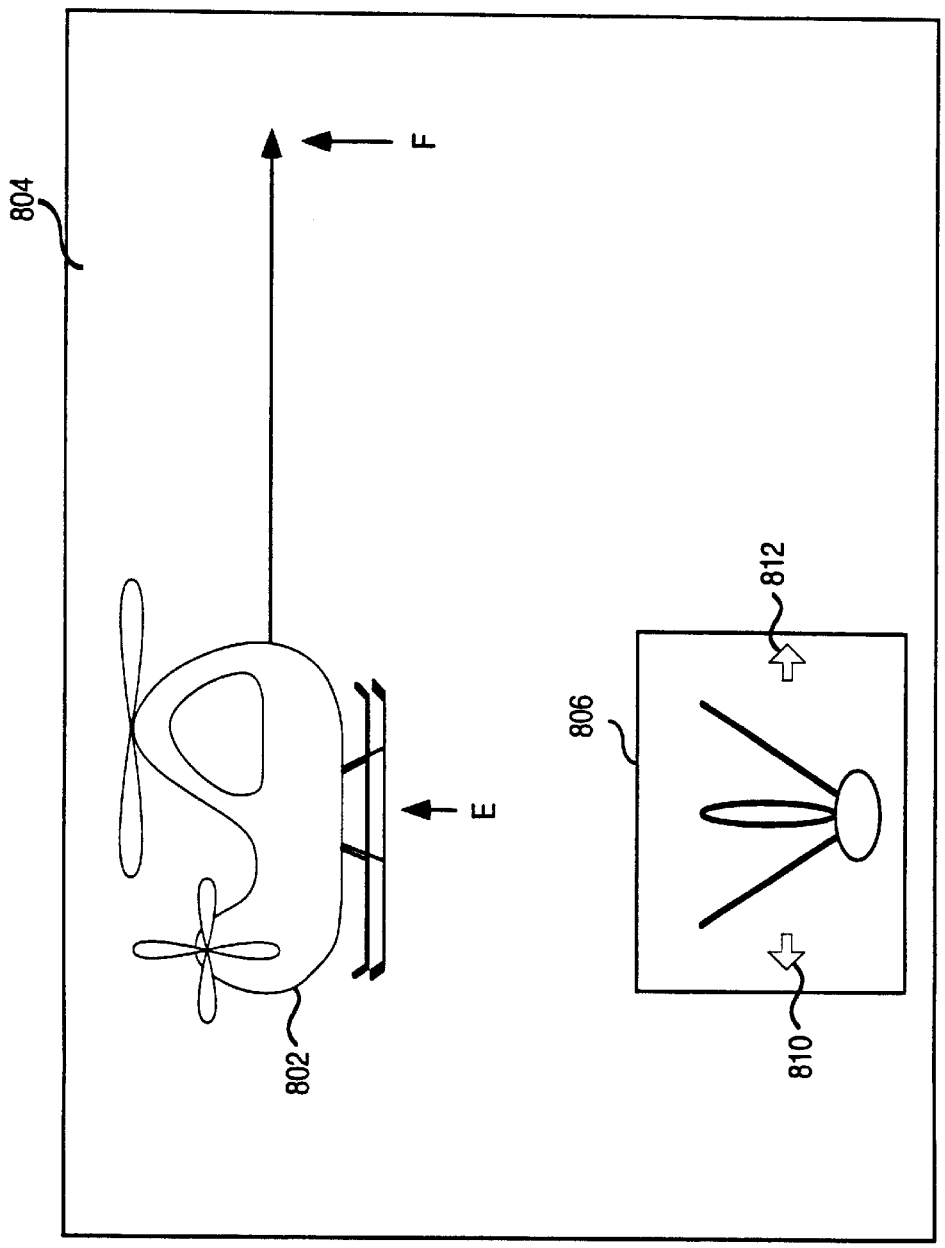
FIG. 8 illustrates a movie generated based on a media container with an embedded control movie.

To provide a control interface during the playback of a movie, a media container that includes media sequence 700 may be embedded into the movie. For example, a movie in which a helicopter 802 flies from a point E to a point F on a screen 804 is illustrated in FIG. 8. Embedded in the movie is a media container that includes media sequence 700. An image 806 corresponding to a sample in media sequence 700 is displayed on screen 804 during playback of the movie.

Because media sequence 700 is contained in an embedded movie, it does not sequence responsive to the time coordinate system that controls the containing movie. However, the image 806 generated by the media sequence may be used to determine a parameter associated with the containing movie, such as the rate at which the containing movie is played back.

Assume, for example, that the movie associated with helicopter 802 is played back at a rate determined by the parameter "speed". The higher the value of "speed", the faster the movie is sequenced during playback. Assume also that the default value for "speed" is "5".

To use image sequence 700 as a control for the value of "speed", the image associated with the default value of "speed" is initially displayed on screen 804. In the present example, the image associated with sample 710, which is the sample associated with the value "5", would be displayed. This image would not change (i.e. media sequence 700 would not be sequenced) responsive to the passage of time in the time coordinate system associated with the containing movie. Rather, some other event, such as user interaction with the image 806, would trigger the sequencing of media sequence 700.

In one embodiment, media sequence 700 is sequenced responsive to the selection of arrows 810 and 812 on image 806. For example, the selection of arrow 810 will cause media sequence 700 to sequence "backward". As a result, the image 806 will reflect the image associated with sample 708. Also, the value of "speed" will be updated to the value associated with the currently-displayed sample. The currently-displayed sample will be sample 708, which is associated with the parameter value "4". Therefore the value of "speed" will be changed to "4", and the rate of playback of the movie associated with helicopter 802 will decrease.

Conversely, the selection of arrow 812 will cause media sequence 700 to sequence "forward". As a result, the image 806 will reflect the image associated with sample 712. Also, the value of "speed" will be updated to the value associated with the currently-displayed sample. The currently-displayed sample will be sample 712, which is associated with the value "6". Therefore the value of "speed" will be changed to "6", and the rate of playback of the movie associated with helicopter 802 will increase.

In the embodiment described above, the sequencing of the control movie containing media sequence 700 is performed by selection of arrows 810 and 812. This selection may be performed, for example, by operating mouse 223 to position a cursor over one of arrows 810 or 812 and clicking a button on the mouse 223. Other user actuated sequencing mechanisms may also be used. For example, the sequencing of the control movie may alternatively be triggered by the selection of screen regions outside of image 806, or by pressing certain keys on keyboard 222.

Control movies have the benefit that once they are created, they may easily be embedded in other movies to provide a graphical user interface for parameter control. Because control movies are movies, they may provide visually sophisticated controls that would otherwise be difficult to display and manage.

While each sample of media sequence 700 is associated with a parameter value, other variations are possible. For example, every fifth sample may be associated with a parameter value. Upon receipt of user input designating a sequence direction, the media sequence 700 may be played in the designated direction until arriving at the next sample associated with a parameter value. Thus, the image 806 displayed responsive to the control movie will appear animated during the parameter change operation.

Database Movies

Figure 9A:
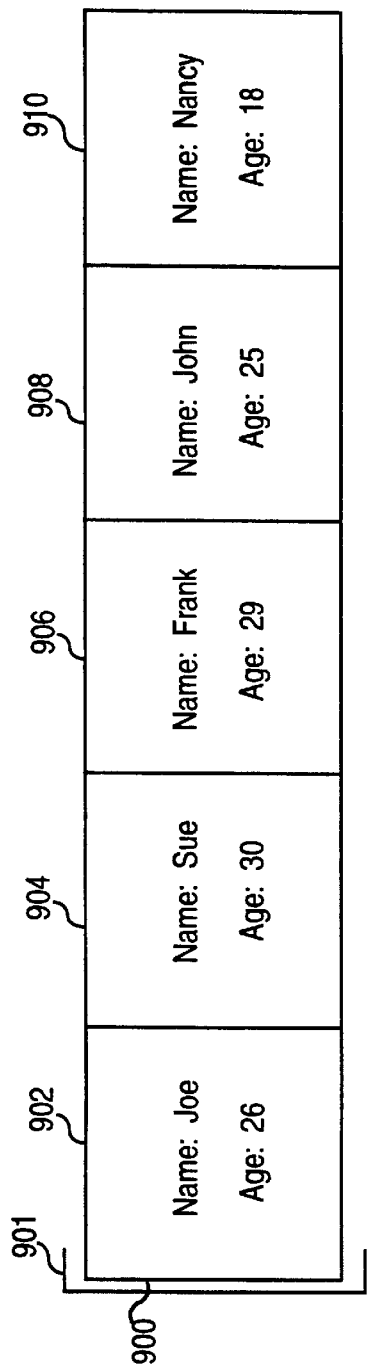
FIG. 9a illustrates a media container for a field-insensitive database movie.

It is possible to search the text track of movies to locate specific words or word patterns. A movie that consists of only a text track is analogous to a text document in which each sample of the text track corresponds to a different page. FIG. 9a illustrates a media container 901 that contains a media sequence 900 in which each sample 902, 904, 906, 908 and 910 includes the name and age of a person. A movie container storing media sequence 900 may be played as shown in FIG. 9b.

Figure 9B:
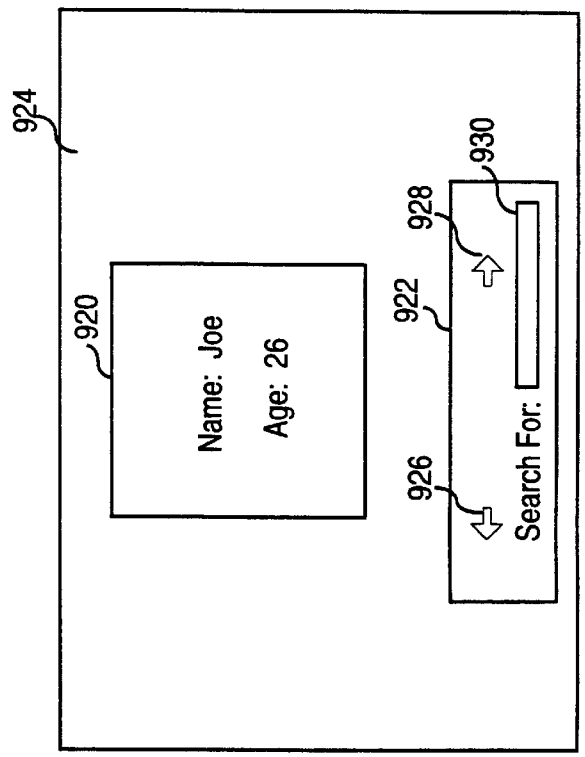

Referring to FIG. 9b, an image 920 corresponding to the currently-played sample of media container 901 is displayed on a screen 924. Along with image 920, a control panel 922 for sequencing media container 901 is also displayed. Control panel 922 includes control arrows 926 and 928 for sequencing media container 901 backward and forward, respectively. In addition, control panel 922 includes a text box 930 into which a user may enter search terms. Entry of search terms into text box 930 initiates a search for terms in the media container 901. If the terms are found, then the media container 901 is sequenced until the sample containing the search terms is displayed.

As described above, media container 901 may be used as a rudimentary database. However, the database provided by media container 901 has the disadvantage that searches are performed on all of the text in the media container 901. For most database applications, it is desirable to limit searches to specified fields. For example, one may want to search for someone born on the tenth of a month, but not someone who is ten years old. If the birth date field cannot be searched separately from the age field, then a search for "10" will match all instances of "10", including people who are "10" years old.

Figure 10A:
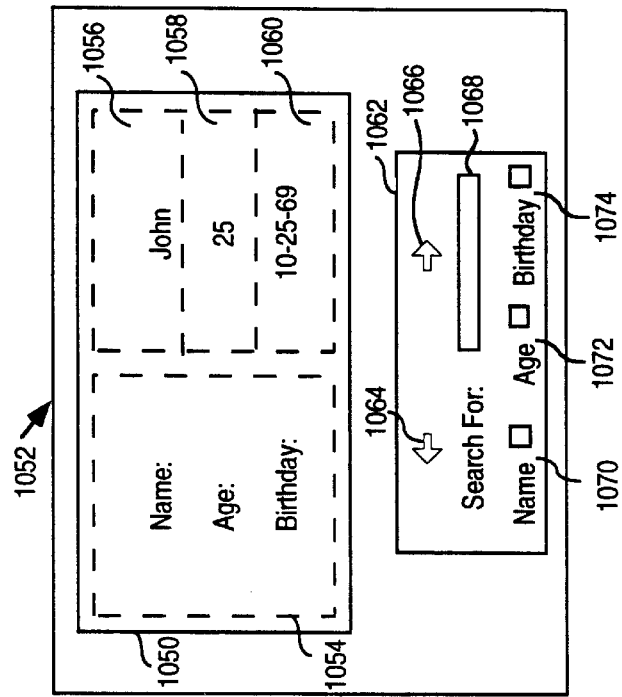
FIG. 10a illustrates a media container for a field-sensitive database movie.

The hierarchical media container format described herein may be used to segregate a movie database into fields. Referring to FIG. 10a, it illustrates a media container 1000 that includes a plurality of media sequences 1016, 1017, 1019, and 1021. Media sequences 1017, 1019 and 1021 respectively contain media containers 1004, 1006 and 1008. Each of the embedded media containers 1004, 1006 and 1008 includes a text media sequence 1010, 1012 and 1014, respectively.

Media sequence 1016 is a media sequence that stores the names of database fields, such as "Name", "Age" and "Birthday". Each sample of media sequence 1010 stores text that indicates the name of an individual. Each sample of media sequence 1012 stores text that indicates the age of an individual. Each sample of media sequence 1014 stores text that indicates the birthday of an individual. Media sequences 1010, 1012 and 1014 are ordered such that at any given sequence location, all three media sequences represent data from the same individual. For example, samples 1018, 1020 and 1022, which are all located at the first sequence position, respectively store the name, age and birthday of the same individual.

Figure 10B:
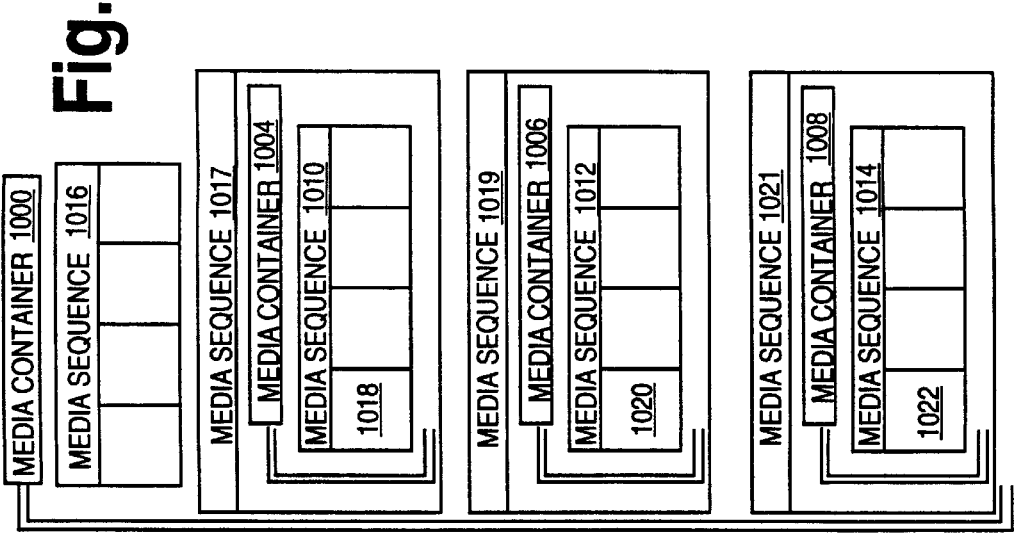

Referring to FIG. 10b, media container 1000 may be "played" to display an image 1050 on a screen 1052. The image 1050 includes a region 1054 in which the current sample of media sequence 1016 is displayed, a region 1056 in which the current sample of media sequence 1010 is displayed, a region 1058 in which the current sample of media sequence 1012 is displayed, and a region 1060 in which the current sample of media sequence 1014 is displayed.

Screen 1052 also contains a control panel 1062 that contains control arrows 1064 and 1066 analogous to control arrows 926 and 928 of FIG. 9b, and a text box 1068 analogous to text box 930 of FIG. 9b. Control panel 1062 also contains controls 1070, 1072 and 1074 that allow a user to choose one or more of the available fields. Because the data for each field is contained in a separate media container, searches may be performed on a field-by-field basis. For example, if a user selects control 1072 and enters "10" into text box 1068, the search is limited to the contents of media container 1006. If a match is found, media container 1000 is sequenced until the sample of sequence 1012 in which the match occurred is displayed.

As is evident by the foregoing, the hierarchical movie structure described herein allows movies to be applied to applications that have previously required complex, customized programming. A single hierarchical movie, in the form of a media container that contains embedded media containers, can contain an entire multimedia application. Further, all or some of the embedded movies may be time-independent. Thus, the timing of one segment or aspect of the resulting movie may vary from performance to performance relative to other segments or aspects of the movie. In addition, the ability to group related media sequences into containers simplifies the movie editing process.

While specific embodiments of the present invention have been described, various modifications and substitutions will become apparent to one skilled in the art by this disclosure. Such modifications and substitutions are within the scope of the present invention, and are intended to be covered by the following claims.

What is claimed is:

1. A computer-readable medium having stored thereon a hierarchical media container, the hierarchical media container comprising:

a first set of media sequences; and an embedded media container comprising a second set of media sequences, wherein
said hierarchical media container is a time-based media container and said embedded media container is a time-independent media container.

2. A method for editing a movie, the method comprising:

storing a first plurality of media sequences of said movie in a first container;

storing a second plurality of media sequences of said movie in a second container;

embedding one of said first container and said second container in the other of said first container and said second container;

receiving from a user an edit of a media sequence of said second plurality of media sequences; and automatically editing all media sequences of said second plurality of media sequences responsive to receiving said edit.

3. The method of claim 2 wherein none of said first plurality of media sequences are automatically edited responsive to receiving said edit.

4. The method of claim 2 wherein said second plurality of media sequences includes a video media sequence and an audio media sequence, wherein said audio media sequence stores sound corresponding to said video media sequence.

5. The method of claim 2 wherein said first plurality of media sequences and said second plurality of media sequences are all time-based media sequences.

6. The method of claim 2 wherein said first plurality of media sequences are time-based media sequences and said second plurality of media sequences are time-independent media sequences.

7. A computer readable medium containing executable computer program instructions which when executed cause a digital processing system to perform a method comprising:

storing a first plurality of media sequences of a first movie in a first container;

storing a second plurality of media sequences of a second movie in a second container;

embedding one of said first container and said second container in the other of said first container and said second container;

receiving from a user an edit of a media sequence of said second plurality of media sequences; and automatically editing media sequences of said second plurality of media sequences responsive to receiving said edit.

8. The computer readable medium of claim 7 wherein none of said first plurality of media sequences are automatically edited responsive to receiving said edit.

9. The computer readable medium of claim 7 wherein said second plurality of media sequences includes a video media sequence and an audio media sequence, wherein said audio media sequence stores sound corresponding to said video media sequence.

10. The computer readable medium of claim 7 wherein said first plurality of media sequences and said second plurality of media sequences are all time-based media sequences.

11. The computer readable medium of claim 7 wherein said first plurality of media sequences are time-based media sequences and said second plurality of media sequences are time-independent media sequences.

12. An apparatus for editing a movie, the apparatus comprising:
   means for storing a first plurality of media sequences of said movie in a first container;
   means for storing a second plurality of media sequences of said movie in a second container;
   means for embedding one of said first container and said second container in the other of said first container and said second container;
   means for receiving from a user an edit of a media sequence of said second plurality of media sequences; and
   means for automatically editing all media sequences of said second plurality of media sequences responsive to receiving said edit.

13. The apparatus of claim 12 wherein none of said first plurality of media sequences are automatically edited responsive to receiving said edit.

14. The apparatus of claim 12 wherein said second plurality of media sequences includes a video media sequence and an audio media sequence, wherein said audio media sequence stores sound corresponding to said video media sequence.

15. The apparatus of claim 12 wherein said first plurality of media sequences and said second plurality of media sequences are all time-based media sequences.

16. The apparatus of claim 12 wherein said first plurality of media sequences are time-based media sequences and said second plurality of media sequences are time-independent media sequences.

17. A method for playing a movie, comprising:
   sequentially playing a first plurality of samples of a first media sequence, wherein
      said first media sequence is stored in a first media container;
   sequentially playing a second plurality of samples of a second media sequence,
      wherein said second media sequence is stored in a second media container,
      wherein said second media container is embedded within said first media container;
   determining a first sample based on user input which selects said first sample instead of a second sample which is different from said first sample, said first and second samples being from a set of samples each of which is associated with a value, said set of samples representing said first media sequence, wherein said first and second samples are part of said first media sequence and have an ordered relationship with respect to each other;
   establishing a value associated with said first sample as a parameter value; and
   controlling the presentation of a media object in accordance with said parameter value.

* * * * *